US009249689B2

(12) United States Patent
Hellat et al.

(10) Patent No.: US 9,249,689 B2
(45) Date of Patent: Feb. 2, 2016

(54) COMBINED CYCLE POWER PLANT WITH FLUE GAS RECIRCULATION

(75) Inventors: Jaan Hellat, Baden-Rütihof (CH); Jürgen Hoffmann, Untersiggenthal (CH)

(73) Assignee: ALSTOM TECHNOLOGY LTD, Baden (CH)

( * ) Notice: Subject to any disclaimer, the term of this patent is extended or adjusted under 35 U.S.C. 154(b) by 1099 days.

(21) Appl. No.: 13/116,522

(22) Filed: May 26, 2011

(65) Prior Publication Data

US 2011/0289898 A1 Dec. 1, 2011

(30) Foreign Application Priority Data

May 26, 2010 (CH) ........................................ 0841/10

(51) Int. Cl.
| | | |
|---|---|---|
| F02C 3/34 | (2006.01) | |
| F01K 23/10 | (2006.01) | |
| F02C 3/28 | (2006.01) | |
| F02C 6/00 | (2006.01) | |
| F02C 9/24 | (2006.01) | |

(52) U.S. Cl.
CPC . F01K 23/10 (2013.01); F02C 3/28 (2013.01); F02C 3/34 (2013.01); F02C 6/003 (2013.01); F02C 9/24 (2013.01); Y02E 20/16 (2013.01)

(58) Field of Classification Search
CPC ................ F02C 3/34; F02C 3/30; F02C 6/18; F02C 1/08; F02C 1/007; Y02E 20/16; F01K 23/10; F01K 23/101
USPC .......... 60/39.52, 39.5, 39.182, 39.15, 39.181, 60/39.17
See application file for complete search history.

(56) References Cited

U.S. PATENT DOCUMENTS

| | | | | |
|---|---|---|---|---|
| 3,703,807 A | * | 11/1972 | Rice | ............................ 60/39.182 |
| 3,785,145 A | * | 1/1974 | Amann | ......................... 60/39.24 |
| 4,441,435 A | | 4/1984 | Miyamoto | |
| 5,634,327 A | | 6/1997 | Kamber et al. | |
| 6,173,562 B1 | | 1/2001 | Utamura et al. | |
| 6,202,400 B1 | | 3/2001 | Utamura et al. | |
| 6,256,976 B1 | * | 7/2001 | Kataoka et al. | .................. 60/775 |
| 6,269,624 B1 | | 8/2001 | Frutschi et al. | |
| 6,529,849 B2 | | 3/2003 | Umezawa et al. | |

(Continued)

FOREIGN PATENT DOCUMENTS

| | | |
|---|---|---|
| DE | 2731387 | 1/1978 |
| EP | 0620363 A1 | 10/1994 |

(Continued)

OTHER PUBLICATIONS

Joos, Franz, "ABB Review May 1998", 1998, pp. 12-13.*

(Continued)

*Primary Examiner* — Steven Sutherland
(74) *Attorney, Agent, or Firm* — Buchanan Ingersoll & Rooney PC

(57) ABSTRACT

An exemplary system method for the operation of a CCPP with flue gas recirculation to reduce NOx emissions and/or to increase the CO2 concentration in the flue gases to facilitate CO2 capture from the flue gases is disclosed. The flue gas recirculation rate (rFRG) is controlled as function of the combustion pressure and/or the hot gas temperature. Operability is enhanced by admixing of oxygen or oxygen enriched air to the gas turbine inlet gases or to the combustion.

18 Claims, 5 Drawing Sheets

(56) References Cited

U.S. PATENT DOCUMENTS

| | | | |
|---|---|---|---|
| 6,598,402 B2* | 7/2003 | Kataoka et al. | 60/775 |
| 6,622,470 B2* | 9/2003 | Viteri et al. | 60/39.52 |
| 6,945,029 B2* | 9/2005 | Viteri | 60/39.17 |
| 7,007,487 B2* | 3/2006 | Belokon et al. | 60/777 |
| 7,036,317 B2 | 5/2006 | Tanaka et al. | |
| 7,191,587 B2* | 3/2007 | Marin et al. | 60/39.17 |
| 7,484,352 B2 | 2/2009 | Flohr et al. | |
| 7,536,252 B1* | 5/2009 | Hibshman et al. | 701/108 |
| 2002/0043063 A1 | 4/2002 | Kataoka et al. | |
| 2003/0152880 A1 | 8/2003 | Eroglu et al. | |
| 2006/0272331 A1 | 12/2006 | Bucker et al. | |
| 2007/0034171 A1* | 2/2007 | Griffin et al. | 122/479.1 |
| 2008/0060346 A1 | 3/2008 | Asen et al. | |
| 2008/0076080 A1 | 3/2008 | Hu et al. | |
| 2009/0145126 A1* | 6/2009 | Chillar et al. | 60/605.2 |
| 2010/0058758 A1 | 3/2010 | Gilchrist, III et al. | |
| 2011/0289899 A1 | 12/2011 | De La Cruz Garcia et al. | |
| 2011/0302922 A1 | 12/2011 | Li et al. | |
| 2011/0314815 A1 | 12/2011 | Li et al. | |
| 2012/0122047 A1 | 5/2012 | Cao et al. | |

FOREIGN PATENT DOCUMENTS

| | | |
|---|---|---|
| EP | 0718470 A2 | 6/1996 |
| EP | 1292795 B1 | 5/2005 |
| EP | 2 246 532 A1 | 11/2010 |
| EP | 2 248 999 A1 | 11/2010 |
| JP | 57-73827 A | 5/1982 |
| JP | 7-34900 A | 2/1995 |
| JP | 2007-170307 A | 7/2007 |
| JP | 2009-197797 A | 9/2009 |
| WO | WO 2004/109075 A1 | 12/2004 |
| WO | WO 2005/064232 A1 | 7/2005 |
| WO | WO 2010/072710 A2 | 7/2010 |
| WO | WO 2010/072729 A2 | 7/2010 |

OTHER PUBLICATIONS

European Search Report (PCT/ISA/201) issued on Apr. 4, 2011, by European Patent Office as the International Searching Authority for Application No. CH 19252010.

O. Bolland et al., New Concepts for Natural Gas Fired Power Plants which Simplify the Recovery of Carbon Dioxide, Energy Convers. Mgmt vol. 33, No. 5-8, pp. 467-475, 1992.

European Search Report (PCT/ISA201) issued Feb. 11, 2011, by European Patent Office and the International Searching Authority for Application No. CH 8412010.

Dieter Winkler et al., Improvement of Gas Turbine Combustion Reactivity under Flue Gas Recirculation Condition with In-Situ Hydrogen Addition, GT2009-59182, Proceedings of ASME Turbo Expo 2009: Power for Land, Sea and Air, Jun. 8-12, 2009, Orlando, Florida, USA, pp. 1-9.

Andre Burdet et al., Combustion under Flue Gas Recirculation Conditions in a Gas Turbine Lean Premix Burner, GT2010-23396, Proceedings of ASME Turbo Expo 2010: Power for Land, Sea and Air, Jun. 14-18, 2010, Glasgow, Scotland, UK, pp. 1-9.

Search Report dated Nov. 28, 2011, issued in the corresponding German Patent Application No. 10 2011 102 721.5. (5 pages).

Japanese Office Action issued in corresponding Japanese Patent Application No. 2011-117926 dated Jan. 5, 2015.

* cited by examiner

COMBINED CYCLE POWER PLANT WITH FLUE GAS RECIRCULATION

RELATED APPLICATION

This application claims priority under 35 U.S.C. §119 to Swiss Patent Application No. 00841/10 filed in Switzerland on May 26, 2010, the entire content of which is hereby incorporated by reference in its entirety.

FIELD

The disclosure relates to power plants, such as a method for operating a combined cycle power plant with flue gas recirculation as well as to a plant to carry out such a method.

BACKGROUND INFORMATION

In recent years it has become obvious that the generation of greenhouse gases leads to global warming and that further increase in greenhouse gas production will accelerate global warming. CO2 (carbon dioxide) is identified as a main greenhouse gas and NOx is believed to significantly contribute to the greenhouse effect as an indirect greenhouse gas by producing ozone in the troposphere. CCS (carbon capture and storage) and reduction of NOx emissions are considered potential major means to reduce and to control global warming.

Reduction of NOx emissions can be achieved either by catalytic cleaning of the flue gases or by reduction of the NOx production during combustion.

There has been a continuous strive for higher hot gas temperatures to increase power plant efficiencies. However, NOx emissions increase with higher combustion temperature. To counter this effect flue gas recirculation has been suggested.

CCS can be defined, for example, as the process of CO2 capture, compression, transport and storage. Capture can be defined, for example, as a process in which CO2 is removed either from the flue gases after combustion of a carbon based fuel or the removal of and processing of carbon before combustion. Regeneration of any absorbents, adsorbents or other means to remove CO2 from a flue gas or fuel gas flow is considered to be part of the capture process.

Backend CO2 capture or post combustion capture is a commercially promising technology for fossil fuelled power plants including CCPP (combined cycle power plants). In post-combustion capture the CO2 is removed from a flue gas. The remaining flue gas is released to the atmosphere and the CO2 is compressed for transportation, and storage. There are several technologies known to remove CO2 from a flue gas such as absorption, adsorption, membrane separation, and cryogenic separation. Power plants with post-combustion capture are the subject of this disclosure.

All known technologies for CO2 capture specify the use of relatively large amounts of energy. Due to the relatively low CO2 concentration of the flue gases of a conventional CCPP, such as 4% for example, the CO2 capture system (also called CO2 capture plant or CO2 capture equipment) for a conventional CCPP can be more costly and energy consuming per kg of captured CO2 than the ones for other types of fossil power plants, such as coal fired plants, which have a relatively higher CO2 concentration.

The CO2 concentration in the CCPP flue gas can depend on the fuel composition, gas turbine type and load and can vary substantially depending on the operating conditions of the gas turbine. This variation in the CO2 concentration can be detrimental to the performance, efficiency, and operatability of the CO2 capture system.

To increase the CO2 concentration in the flue gases of a CCPP two main concepts are known. One concept can involve the recirculation of flue gases as for example described by O. Bolland and S. Saether in "NEW CONCEPTS FOR NATURAL GAS FIRED POWER PLANTS WHICH SIMPLIFY THE RECOVERY OF CARBON DIOXIDE" (Energy Conyers. Mgmt Vol. 33, No. 5-8, pp. 467-475, 1992). Another concencpt can involve the sequential arrangement of plants, where the flue gas of a first CCPP is cooled down and used as inlet gas for a second CCPP to obtain a flue gas with increased CO2 in the flue gas of the second CCPP. Such an arrangement is for example described in US20080060346. These methods can reduce the total amount of flue gas discharged to ambient surrounding and can increase the CO2 concentration, and thereby reduce the specified flow capacity of an absorber, the power consumption of the capture system, the capital expenditure for the capture system, and increase the CO2 capture system's efficiency. However, flue gas recirculation reduces the oxygen content in the inlet gases of the gas turbine and affects combustion. Besides positive effects on NOx emission the reduced oxygen content can lead to an incomplete unstable combustion and result in high CO emissions, which is highly undesirable.

SUMMARY

An exemplary embodiment is directed to a method for operating a combined cycle power plant (CCPP) having a gas turbine and a heat recovery steam generator (HRSG) with a flue gas recirculation system. The method comprises controlling a flue gas recirculation rate (rFRG) of flue gases recirculated into a compressor inlet gas of the gas turbine by the flue gas recirculation system Iled as a function of a combustion pressure and/or a hot gas temperature (Thot).

Another exemplary embodiment is directed to a power plant designed for operation according to a method for operating a combined cycle power plant (CCPP) having a gas turbine and a heat recovery steam generator (HRSG) with a flue gas recirculation system. The power plant comprises a gas turbine; a heat recovery steam generator; a steam turbine; a flue gas recirculation line with a recirculation flue gas re-cooler; at least one compressor exit pressure and/or compressor exit temperature measurement device; and at least one oxygen and/or CO2 measurement device between a mixing point of recirculated flue gas and ambient air and a compressor of the gas turbine and/or at least one oxygen and/or CO2 measurement device and/or at least one CO and/or unburned hydrocarbon measurement device downstream of the gas turbine.

BRIEF DESCRIPTION OF THE DRAWINGS

The disclosure, its nature as well as its advantages, shall be described in more detail below with the aid of the accompanying drawings as follows.

DETAILED DESCRIPTION

Figure 1:
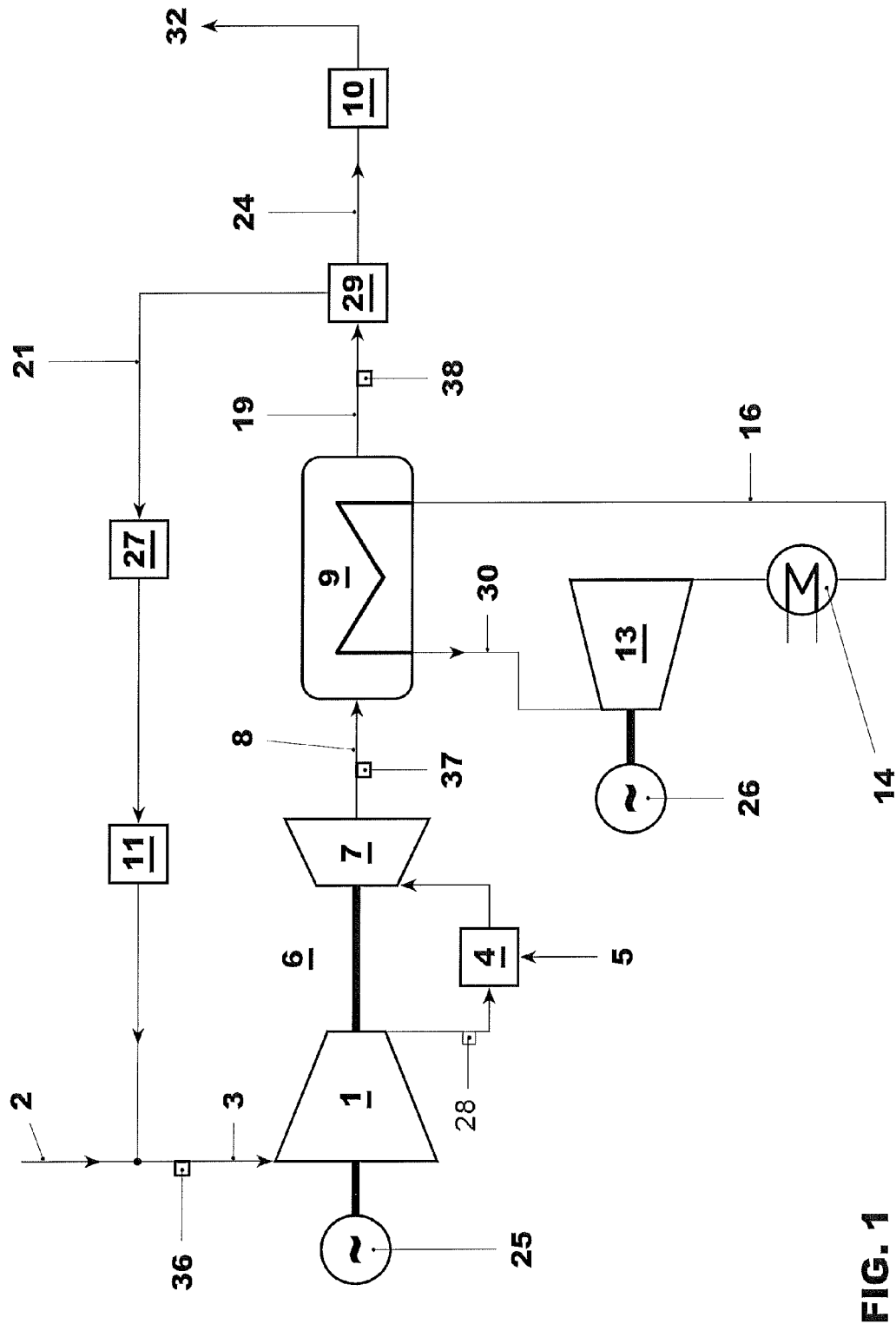
FIG. 1 illustrates a CCPP with flue gas recirculation, and variable speed blowers in accordance with an exemplary embodiment.

Exemplary embodiments of the present disclosure provide a low CO emission and low NOx emission operating method for a combined cycle power plant (CCPP) that includes at least one gas turbine with flue gas recirculation, one heat recovery steam generator (HRSG), and one steam turbine, as well as a plant designed to operate according to an exemplary method.

The exemplary embodiments also allow a high flue gas recirculation rate while maintaining stable, clean combustion and to provide a flexible operation method for flue gas recirculation operation.

Exemplary embodiments of the present disclosure take advantage of the finding that burn out of CO, in other word reaction of CO with oxygen to form CO2, is facilitated by a high combustion pressure. To take advantage of this effect an exemplary operating method, in which the flue gas recirculation rate is a function of the combustion pressure, is disclosed. The flue gas recirculation rate rFRG can be defined as the ratio of flue gas mass flow from the gas turbine, which is recirculated to the compressor inlet, to the total flue gas mass flow of the gas turbine. In combination with the NOx reducing effect of flue gas recirculation an exemplary operating method, which leads to both low NOx and low CO emissions, can be established.

Another factor influencing the CO emissions is the combustion temperature or hot gas temperature. In a more refined approach the recirculation rate can be defined as a function of combustion pressure and the hot gas temperature.

The compressor exit pressure or another pressure, which is proportional to the combustor pressure, as for example a suitable cooling air pressure, can be used instead of the combustion pressure. The compressor exit pressure can be used, because of the ease of measurement. Further, the compressor exit temperature is proportional to the pressure ratio and can therefore also be used. When using the compressor exit temperature, it can be corrected for ambient temperature, to achieve optical results.

In an exemplary embodiment is directed to a control band, which gives an allowable flue gas recirculation rate as a function of the combustion pressure and/or hot gas temperature is disclosed. A target value for the flue gas recirculation rate can be calculated as a function of the combustion pressure and/or hot gas temperature. The actual flue gas recirculation rate can be corrected by a fine control, which adjusts the flue gas recirculation rate depending on the CO emissions. The CO emissions are measured on line for this control method.

In another exemplary embodiment a two-point control can be used to adjust the flue gas recirculation rate as follows: Once the CO emissions increase above a first threshold the recirculation rate is reduced. Once the CO2 emissions fall below a second threshold value the recirculation rate is increased. Instead of threshold values a correction function of the recirculation rate, which is used to calculate the specified correction of the flue gas recirculation rate can also be used. The correction function delivers the offset between the target recirculation rate, which was calculated based on the combustion pressure, and the actual recirculation rate specified to bring the CO emissions to the desired level. A simple proportional control, which gives an offset proportional to the difference in CO emissions and a target CO emission value, can be used for correction. In a further embodiment the threshold values or correction functions can also depend on the relative load of the CCPP.

In another exemplary embodiment, a recirculation rate as function of the measured unburned hydrocarbon emissions of the flue gases. Here, a two-point control or a correction function of the recirculation rate, which depends on the unburned hydrocarbon emission can be used as a function of the CO emission. The correction function delivers the offset between the target recirculation rate, which was calculated based on the combustion pressure, and the actual recirculation rate specified to bring the unburned hydrocarbon emissions to the desired level. A simple proportional control, which gives an offset proportional to the difference in unburned hydrogen emissions and a target CO emission value, can be used for correction. In a further embodiment the threshold values or correction functions are depending also on the relative load of the CCPP.

Further, the actual O2 concentration remaining in the compressor inlet gas has a significant influence on the combustion process and can be used to adjust the flue gas recirculation rate. Instead of using the O2 concentration in the inlet gas as a control parameter, the use of the O2 and/or CO2 concentration in other gas flows, which allow an estimation of the flue gas O2 concentration at the combustor inlet, is feasible. For example use of the CO2 concentration in the turbine's flue gas, can be used. Further, the residual oxygen concentration in the recirculated flue gases or the oxygen concentration in the cooling airflows can be used. The use of a combination of these concentrations is also feasible.

The optimum target values for these parameters depend on the specific plant design and are a function of the ambient conditions and the plant load. Their influence on the overall efficiency depends on the plant operating conditions.

The specified O2 concentration depends on the combustion pressure and temperature. Thus, the specified O2 concentration can be calculated as a function of the combustion pressure and/or hot gas temperature. Based on the specified O2 concentration the flue gas recirculation rate can be controlled such that the inlet fluid of the gas turbine has the specified O2 concentration.

The maximum recirculation rate can often be limited by the oxygen concentration specified for stable, complete combustion. Stable complete combustion in this context means, that CO and unburned hydrocarbon emissions (UHC) stay below the specified level set for CO and unburned hydrocarbon emissions, which is in the order of ppm or single digit ppms, and that the combustion pulsations stay within the normal design values. Emission levels can be prescribed by definite values. Design values for pulsation depend on the gas turbine, operating point, and combustor design, as well as on the pulsation frequency. They should remain well below the combustor pressure, such as 10% below the combustor pressure and preferably below 1 or 2% of the combustor pressure. In one embodiment the recirculation rate is adjusted or fine-tuned depending on the pulsation. For example a target value for the recirculation rate is calculated based on the compressor exit pressure or the compressor pressure ratio. It is reduced for high combustion pulsations or increased at very low combustion pulsations. These adjustments can be allowed and carried out within a bandwidth around the pressure dependent target value.

In another exemplary embodiment, an oxygen enrichment of the compressor inlet gases can be used to increase the operational flexibility and to allow a higher recirculation rate to further increase in the CO2 concentration in the flue gases at base load and part load. For this embodiment, oxygen or oxygen enriched air is admixed to the compressor inlet gases of the gas turbine. In one embodiment the admixture of oxygen is inversely proportional to the compressor exit pressure.

In a first approximation, the capture systems specific energy consumption can be proportional to the CO2 concentration of the flue gases. In this context capture system specific energy consumption is defined as the energy needed to remove one mass unit of CO2 from flue gas. Since the CO2 concentration in the flue gases is proportional to the recirculation rate, an optimization target is a high recirculation rate.

The higher recirculation rate not only increases the CO2 concentration but also leads to a reduction in the flue gas mass and volume flow passing through the CO2 capture system. The lower flow also reduces the pressure drop of the system, which is advantageous to the overall performance or allows the use of smaller, less costly equipment. At base load under design conditions, the flue gas recirculation rate can be maximized, and defined by the minimum oxygen concentration specified for the operation of the gas turbine. In an exemplary embodiment, recirculation rates can be on the order of 30% to 50% for example for base load operation.

At part load operation of the gas turbine, the CO2 concentration in conventional gas turbine flue gases can be lower than at base load operation and the oxygen consumption for combustion decreases.

To take into account the differences in CO2 production a target CO2 or target residual oxygen content as a function of the combustion pressure can be used in another embodiment.

Flame quenching or partial quenching, which can occur at part load, can also depend on the cooling air mass flows and cooling air temperatures. For most gas turbine designs the cooling air temperatures and mass flows are a function of the compressor inlet conditions and position of variable inlet guide vanes. In an exemplary embodiment an additional function can take the influence of the inlet conditions and/or position of variable inlet guide vanes on the specified minimum oxygen concentration into account. The recirculation rate can be corrected accordingly, e.g. the recirculation rate can be reduced for low cooling air temperature when the quenching effect of cooling air on the flame is high and the recirculation rate is increased for high cooling air temperature when the quenching effect of cooling air is lower.

In exemplary embodiments, any combination of the above described control methods can be implemented as desired. In particular, a combustion pressure dependent recirculation rate, or a combustion pressure dependent function of the target inlet oxygen concentration can be combined with a correction based on measurement of combustion parameters like CO emissions, and/or unburned hydrocarbon emissions, and/or pulsations.

The flue gas recirculation rate can be increased to an optimal value in combination with admixing of oxygen or oxygen enriched gas at which the oxygen concentration is kept to meet the minimum specified level, targeting the optimal plant thermodynamic and economic performances. Admixing of oxygen or oxygen enriched air can be applied as far as justified considering the trade off of ASU (air separation unit) and benefits due to reduced emissions.

In one embodiment the admixing of oxygen or oxygen enriched air to the compressor inlet gases is done to control the oxygen concentration at the inlet. The target oxygen concentration at compressor inlet is for example given as a function of combustion pressure.

In a further embodiment the admixing of oxygen or oxygen enriched air to the compressor inlet gases is carried out as function of CO or unburned hydrocarbons. Once the CO and/or unburned hydrocarbon emissions increase above a first threshold the admixing of oxygen or oxygen enriched air is increased. Once they are below a second threshold value the admixing is reduced. Instead of threshold values a correction function of the admixing, which depends on the CO and/or unburned hydrocarbon emissions can also be used. In a further embodiment the threshold values or correction functions are depending also on the relative load of the CCPP.

Flame or combustor pulsations, which can increase if the combustion is incomplete, can also be measured and can be used as a control parameter for the admixing of oxygen or oxygen enriched air. In one embodiment a two-point control is used to adjust the flue gas recirculation rate as follows: Once the pulsation level increase above a first threshold the admixing is increased. Once pulsation levels are below a second threshold value the admixing is reduced. Depending on the combustor a specific pulsation frequency band can be used for the pulsation dependent admixing control. In an exemplary embodiment, threshold values a correction function of the recirculation rate, which depends on the pulsation level can be used. In another exemplary embodiment, simple proportional control, which gives an offset in flue gas recirculation rate proportional to the difference in measured pulsation and a target pulsation value, can be used for correction.

For a control method, which uses the combustor pulsations as a control parameter, at least one corresponding pulsation measurement device has to be connected to the combustor.

For a control method, which uses the CO or unburned hydrocarbons emissions as a control parameter, at least one corresponding measurement device has to be installed downstream of the gas turbine.

In a further exemplary embodiment control of the recirculation rate is combined with a control of the admixture of oxygen or oxygen enriched air. These control methods can be combined in any conceivable manner as desired.

For example a recirculation rate can be given as a function of pressure to minimize NOx and/or to optimize the flow in the CO2 capture system, and the admixture can be used to control the stable complete combustion. In a second example the admixture of oxygen or oxygen enriched air is kept at a constant level due to the size of the ASU and the recirculation rate is used to control the stable complete combustion.

Further, the flue gas flow can become smaller with reduced load. An increase of the recirculation rate combined with lower flue gas mass flow of the gas turbine can lead to a significant drop in the flue gas mass flow leaving the power plant. The flue gas flow, which is sent to the CO2 capture unit, can therefore be reduced for operation with CO2 capture. However, depending on the design, an optimum mass flow or flow velocity should be maintained in the CO2 capture system. This optimum flow can limit, (e.g. specify) the recirculation rate. Depending on the design of the CO2 capture system, a reduction in the recirculation rate can therefore be specified at low loads to maintain the optimum flow through the CO2 capture system. Depending on the CO2 capture unit, the capture unit's efficiency can be independent of the flow without a pronounced maximum efficiency over flow rate. However, the efficiency can still be limited (e.g. specified) by a minimum flow below which flow instabilities can occur that can lead to vibrations in the CO2 capture system. In this case the control is simplified to assure the minimum flow.

During base load operation the plant power can drop with increasing gas turbine inlet temperature. The target re-cooling temperature can therefore be as low as possible. The cooling temperature is normally limited (e.g. specified) by the capacity of the re-cooler. Only if a large low temperature heat sink is available, e.g. low ambient temperature and/or low temperature cooling water, or if icing danger or other operating parameters of the plant might restrict the operation, the re-cooling temperature might be controlled to a higher target temperature.

At part load, when the total mass flows are reduced, the total recirculation mass flow also decreases, and the re-cooler has the capacity to cool to a lower temperature than at base load. However, for most plant designs increasing the compressor inlet temperature of the gas turbine can increase the part load efficiency at a certain load set point.

The efficiency of a CCPP can be proportional to the load. When operating at a fixed absolute load, relative load increases with increasing inlet temperature of the gas turbine. The efficiency benefit due the increase is higher than the efficiency penalty, which might be caused by an increase of the inlet temperature.

The exit temperature of the re-cooler, which cools the recirculated flue gases, and therefore the re-cooling temperature can be increased at part load to realize the higher gas turbine compressor inlet temperature as long as the compressor inlet temperature stays within the operating limits of the gas turbine. Therefore, an exemplary embodiment is directed to a load and recirculation rate dependent re-cooling temperature. In this embodiment the re-cooling temperature can be controlled based on the recirculation rate such that after mixture of ambient air with the re-cooled flue gases, the inlet temperature is obtained, which leads to the best efficiency at the current power output.

In case of a plant with CO2 capture, the flue gas temperature to the CO2 capture plant after cooling shall also be optimized for the CO2 capture system, taking into account the cooler limitations.

The CO2 capture system itself can consist (e.g. comprise) of more than one capture train. To optimize the part load operation it can be advantageous to shut down at least one capture train. As a result, the optimum recirculation rate can become a function of the active capture trains. The integration of the capture system operation with the CCPP operation is advantageous for the overall plant efficiency.

In a first control step the number of active capture trains can be adjusted to the plant load. In a second step the recirculation rate can be adjusted to optimize the plant efficiency at the specific load and with the specific number of active capture trains. Based on these control steps, either the recirculation rate is used to control the CO2 concentration in the flue gases at the optimum level for the active trains of the capture system or it is used to keep the flow velocity in the capture trains at the optimum speed.

A plant designed for optimized operation includes at least one gas turbine, a flue gas recirculation system with a flue gas duct, which directs a first partial flow of the flow gases to the compressor inlet gas flow, at least one control organ to control the recirculation ratio, a re-cooler with temperature control to cool the recirculation flue gases, at least one combustion pressure measurement, and at least one CO2 and/or oxygen concentration measurement device. Instead of the combustion pressure measurement device a compressor exit pressure measurement device or compressor exit temperature device can be used.

A recirculation system can comprise a flue gas recirculation line or duct, a control organ to control the recirculation rate, and a recirculation flue gas cooler. For recirculation the flue gas flow is divided into at least two partial flows downstream of the HRSG. A first partial flow is returned to the inlet of the gas turbine via a flue gas recirculation line, and a second partial flow is directed to the stack for release to the environment. In case of CCS the second portion flow is directed to the stack via the CO2 capture system. In the CCS case, a bypass around the CO2 capture system may be provided to increase the operational flexibility. This allows a choice of any combination of recirculation rate, of flue gas flow to CO2 capture unit, and direct flue gas flow to the stack.

To control the recirculation rate the exhaust flow and/or recirculation flow can be controlled by at least one control organ. This control can include, for example a controllable damper or a fixed splitter combined with a control organ in one or both of the flue gas lines downstream of the splitter.

As mentioned above, the first partial flow, which is recirculated, can be further cooled by a re-cooler before mixing with ambient air for reintroduction into the compressor of the gas turbine. In one embodiment the control organ to control the recirculation rate, such as a flap or valve, for example, is installed downstream of this re-cooler to reduce thermal load on this control organ.

In a further embodiment a blower can be installed in the recirculation lines and/or the exhaust gas lines. The blower can be advantageous to reduce equipment size as the allowable pressure drop is increased. Practical equipment sizes can only be realized with a reasonable pressure drop over the capture system and recirculation lines. Limitations by the gas turbine and HRSG design can be overcome.

The blowers can be located downstream of the coolers, which reduces their power consumption and the thermal load they have to withstand. Further, they can operate under stable flue gas temperature and at smaller volume flows compared to a design in which the blowers are located upstream of the coolers.

Further, to minimize the power consumption of the blower, exemplary embodiments are directed to variable speed control. As a result, the blower can be used to control the recirculation rate. Variable dampers, flaps or control valves, which inherently cause a pressure drop, can be avoided. Therefore, the system's total pressure drop can be reduced by the use of variable speed blowers. Alternatively, a blower with controllable blade or guide vane angles is also conceivable. Depending on the design and pressures in the flue gas and recirculation system boosters can be used instead of blowers.

To allow continuous oxygen enrichment of the compressor inlet gases of combustor inlet gases an embodiment of the plant comprises an air separation unit or a membrane based oxygen enrichment unit to produce the specified oxygen.

The above described gas turbine can be a singe combustion gas turbine or a sequential combustion gas turbine as known for example from EP0620363 B1 or EP0718470 A2. To ensure the beneficial effects of high combustion pressure on CO emissions the sequential combustion gas turbine can be designed such that the pressure in the second combustion chamber is above 15 bara at full load operation.

An exemplary power plant for execution of the proposed method can include a conventional CCPP, and equipment for flue gas recirculation.

FIG. 1 illustrates a CCPP with flue gas recirculation, and variable speed blowers in accordance with an exemplary embodiment. A turbine 6, which drives a first generator 25, is supplied with compressor inlet gas 3, and fuel 5. The compressor inlet gas 3 is a mixture of ambient air 2, and flue gas, which is recirculated via a flue gas recirculation line. The compressor inlet gas 3 can be compressed in a compressor 1. The compressed gas is used for combustion of the fuel 5 in a combustor 4, and the pressurized hot gases expand in a turbine 7. Its main outputs are electric power, and hot flue gases 8.

The gas turbine's hot flue gases 8 pass through a HRSG 9, which generates live steam 30 for a steam turbine 13. The steam turbine 13 either is arranged in a single shaft configuration with the gas turbine 6 and a first generator 25, or is arranged in a multi shaft configuration to drive a second generator 26. The steam leaving the steam turbine 13 is sent to a condenser 14 and returned to the HRSG. The steam cycle is simplified and shown schematically without different steam pressure levels, feed water pumps, etc., as these are not subject of the disclosure.

A first partial flow 21 of the flue gases from the HRSG 19 can be recirculated to the inlet of the compressor 1 of the gas turbine 6 where it is mixed with ambient air 2. The first partial flow 21 is cooled in the recirculation flue gas cooler 27 before mixing with the ambient air 2

A second partial flow 20 of the flue gases from the HRSG 19 can be directed to the stack 32 by the damper 29. To enhance the flue gas flow and to control the recirculation rate a variable speed flue gas blower 10 to the stack 32 can be installed between flue gas cooler 23 and the stack 32. Further, a variable speed flue gas blower for recirculation 11 can be installed downstream of the recirculation flue gas cooler 27 before mixing the recirculated first partial flow 21 of the flue gases with the ambient air 2.

Figure 2:
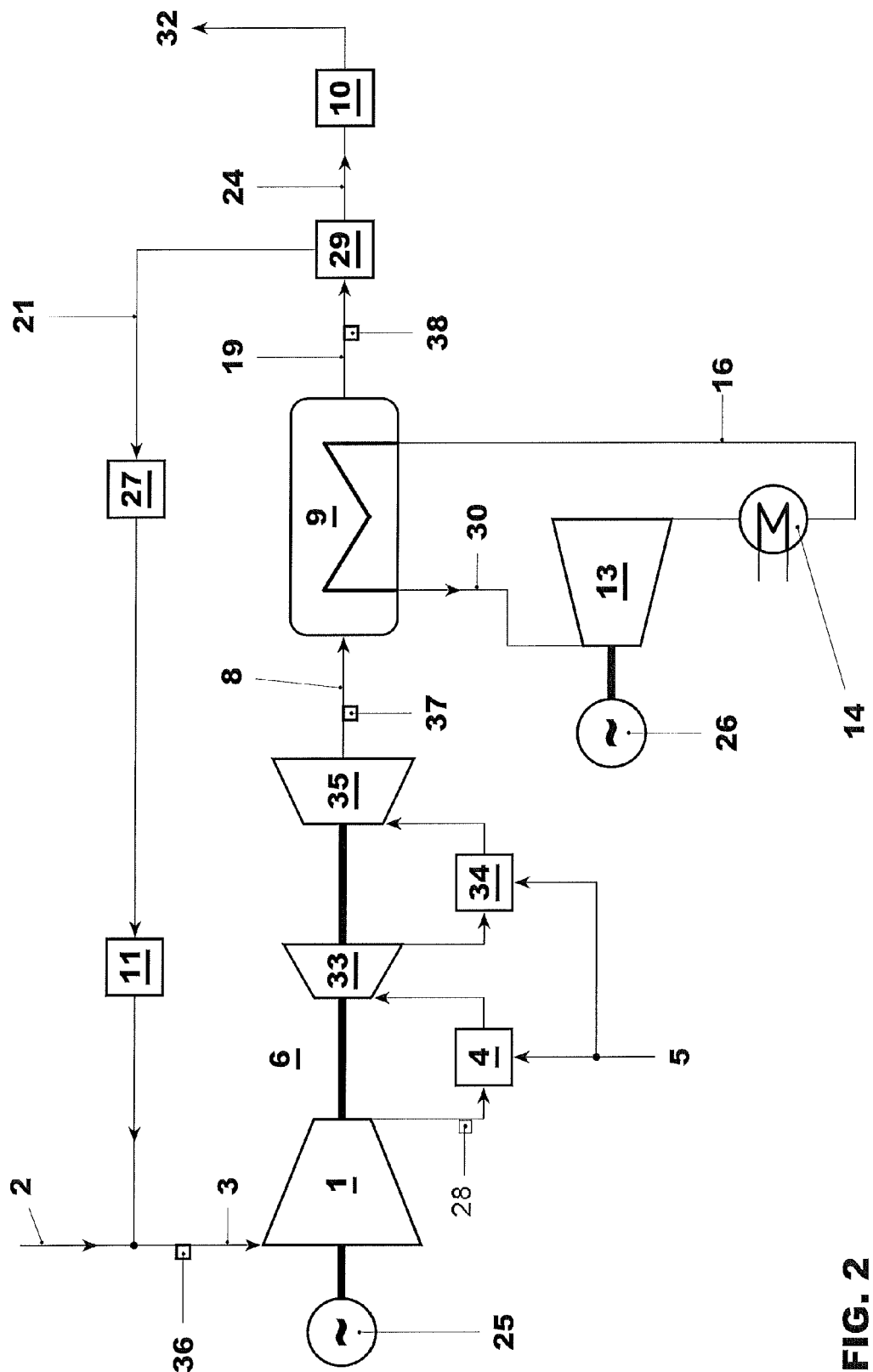
FIG. 2 illustrates a CCPP with a sequential combustion gas turbine, flue gas recirculation, and variable speed blowers in accordance with an exemplary embodiment.

FIG. 2 illustrates a CCPP with a sequential combustion gas turbine, flue gas recirculation, and variable speed blowers in accordance with an exemplary embodiment. Instead of a single combustion chamber 4 with one turbine 7 the sequential combustion gas turbine of FIG. 2 has a combustor 7 followed by a high-pressure turbine 33. The partially expanded gases leaving the high-pressure turbine a reheated in the second combustion chamber 34 before they are further expanded in the low-pressure turbine 35.

Figure 3:
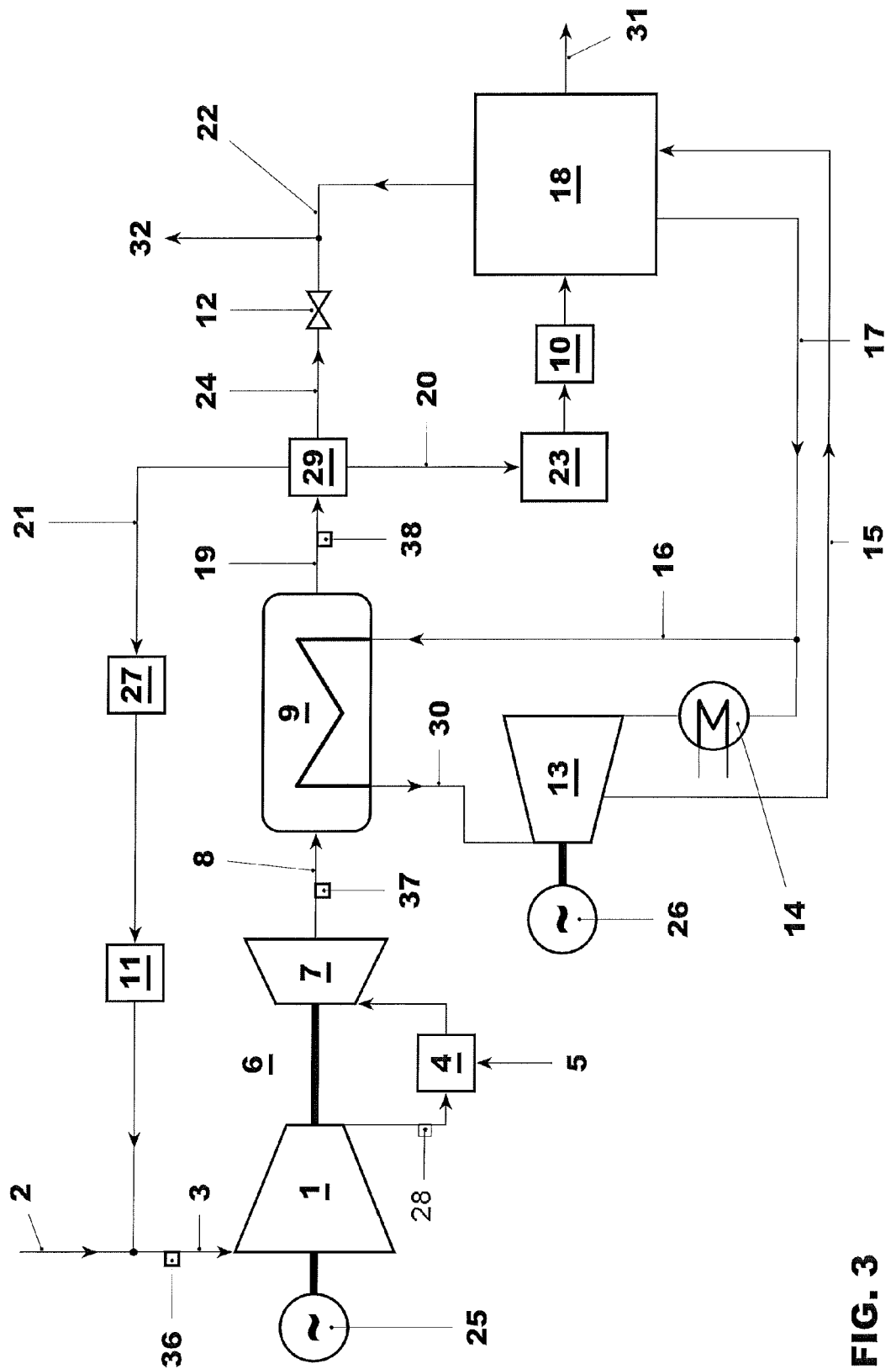
FIG. 3 illustrates a CCPP with backend CO2 absorption including flue gas recirculation, and variable speed blowers in accordance with an exemplary embodiment.

FIG. 3 illustrates a CCPP with backend CO2 absorption including flue gas recirculation, and variable speed blowers in accordance with an exemplary embodiment. In addition to the CCPP shown in FIG. 1 the plant of FIG. 3 comprises a CO2 capture system. The gas turbine's hot flue gases 8 pass through a HRSG 9, which generates live steam 30 for a steam turbine 13. The steam turbine 13 can be arranged either in a single shaft configuration with the gas turbine 6 and a first generator 25, or in a multi shaft configuration to drive a second generator 26. Further, steam is extracted from the steam turbine 13 and supplied via a steam line 15 to the CO2 capture system 18. The steam can be returned to the steam cycle at reduced temperature or as a condensate via the return line 17 and is reintroduced into the steam cycle. The steam cycle is simplified and shown schematically without different steam pressure levels, feed water pumps, etc., as these are not subject of the disclosure.

A first partial flow 21 of the flue gases from the HRSG 19 can be recirculated to the inlet of the compressor 1 of the gas turbine 6 where it is mixed with ambient air 2. The first partial flow 21 is cooled in the recirculation flue gas cooler 27 before mixing with the ambient air 2

A second partial flow 20 of the flue gases from the HRSG 19 can be directed to the CO2 capture system 18 by the damper 29. The flue gas cooler 23 upstream of the CO2 capture system 18 cools this second partial flow 20. To enhance the flue gas flow and to control the recirculation rate a variable speed flue gas blower to CO2 capture system 10 can be installed between flue gas cooler 23 and the CO2 capture system 18, and a variable speed flue gas blower for recirculation 11 is installed downstream of the recirculation flue gas cooler 27 before mixing the recirculated first partial flow 21 of the flue gases with the ambient air 2.

The CO2 depleted flue gas 22 can be released from the CO2 capture system 18 to the environment via a stack 32. In case the CO2 capture system 18 is not operating, it can be bypassed via the flue gas bypass 24.

During normal operation the captured CO2 31 will be compressed in a CO2 compressor and the compressed CO2 will be forwarded for storage or further treatment.

In exemplarye mbodiments, measurement devices to measure the oxygen and/or CO2 concentration can be provided to better control the oxygen concentration of the different gas streams.

By controlling the recirculation mass flow, controlling the temperature after recirculation flue gas re-cooler 27, and taking into account the temperature of the ambient air, and the inlet mass flow of the compressor 1, the inlet temperature of the compressor 1 can be controlled.

At base load the re-cooling temperature can be limited (e.g. specified) by the capacity of the recirculation flue gas re-cooler 27, and depends on the available heat sink. In case of a cooling water cooler with cooling water from a river or the sea, the water temperature dictates the possible re-cooling temperature. In case of an air cooler, the minimum re-cooling temperature can be above ambient temperature such as 5 to 10° C., for example. Depending on the recirculation rate the temperature rise in the compressor inlet temperature is smaller.

If a specific part load power output is specified from the CCPP the turbine inlet temperature or hot gas temperature can be reduced, and the variable inlet guide vanes are closed according to the operating concept until the target power is met. Both lead to a reduction in the plant efficiency, which is proportional to the relative load reduction. By controlling the compressor inlet temperature, the base load power of the plant can be controlled. In particular an increase in the compressor inlet temperature leads to a reduction in the base load power. As a result, the specific power output mentioned above might be reached at base load or at an increased relative power. As long as the efficiency gain due to operation at increased relative load is bigger than the efficiency penalty due to operation at an increased inlet temperature, increasing the compressor inlet temperature can increase the overall efficiency. A plant specific optimum compressor inlet temperature can be determined for every load set point. Based on the optimum compressor inlet temperature, temperature of the ambient air 2, and the load specific gas turbine recirculation rate rGT an optimum re-cooling temperature Trecool can be determined. At base load this is limited by the cooling capacity of the re-cooler. At lower loads the re-cooling temperature Trecool can be raised until the mixture of ambient air and re-cooled flue gases reach the allowable maximum compressor inlet temperature. In this example the maximum allowable compressor inlet temperature is a fixed value. However, since the gas turbine recirculation rate changes over load, the re-cooling temperature Trecool specified to obtain the constant mixing temperature also changes over load.

Depending on the design of the gas turbine 6, the allowable maximum compressor inlet temperature is not constant. For example this can be the case if the compressor end temperature or a cooling air bleed temperature from the mid compressor is the limiting factor. As result a different limiting function for the re-cooling temperature Trecool would be obtained.

In an exemplary embodiment the influence of ambient pressure, humidity and inlet/outlet pressure drop can for example also be taken into account to determine the load specific optimum compressor inlet temperature and the corresponding optimum re-cooling temperature.

Figure 4:
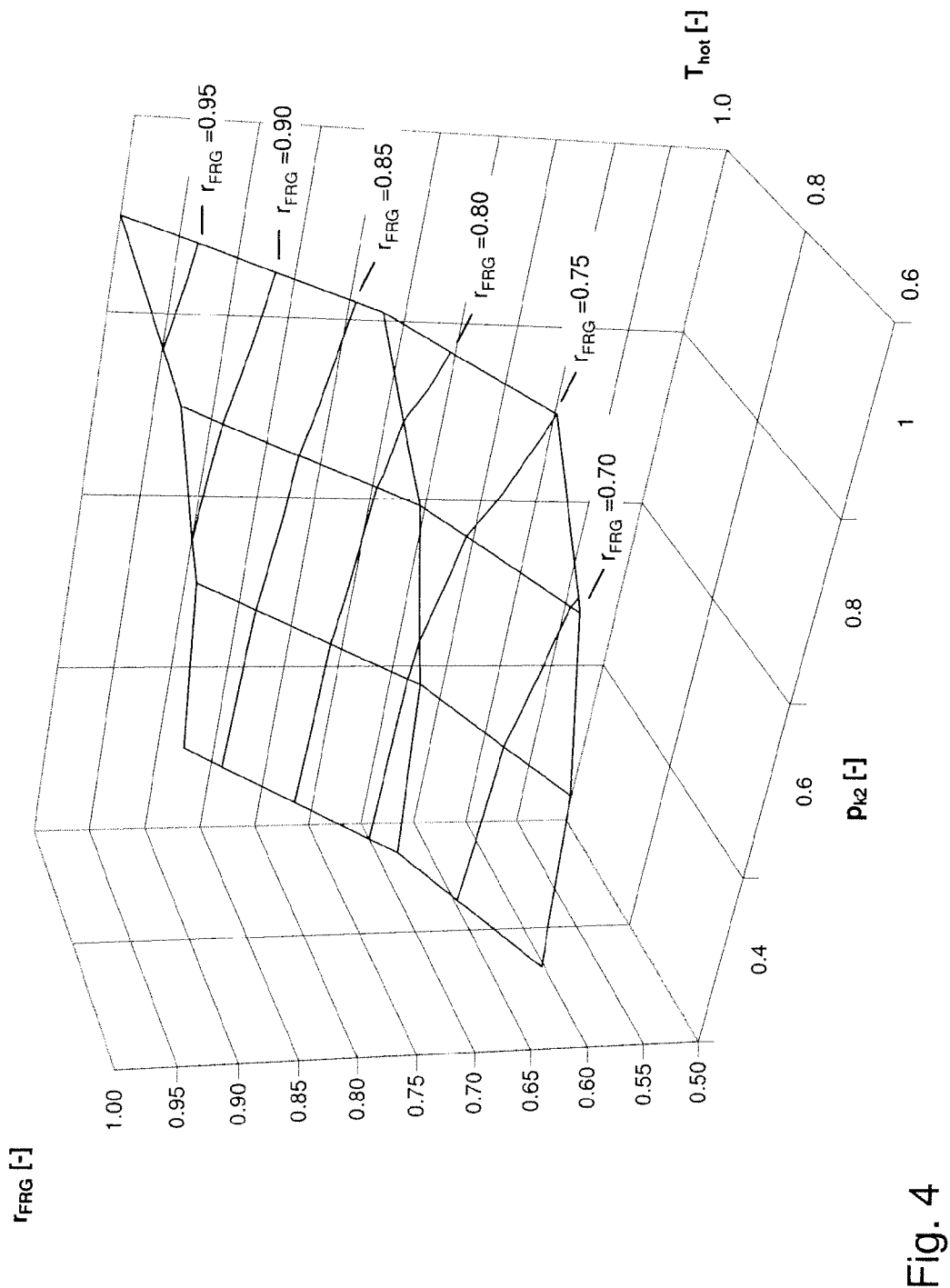
FIG. 4 illustrates an example of the flue gas recirculation rate as a function of the compressor exit pressure and the hot gas temperature in accordance with an exemplary embodiment.

FIG. 4 illustrates an example of the flue gas recirculation rate as a function of the compressor exit pressure and the hot gas temperature in accordance with an exemplary embodiment. The compressor exit pressure pk2 can be normalized with the compressor exit pressure at full load under design conditions, the hot gas temperature Thot can be normalized with the hot gas temperature at full load under design conditions, and the flue gas recirculation rate rFRG can be normalized with the flue gas recirculation rate at full load under design conditions. At full load, the normalized compressor exit pressure pk2, hot gas temperature Tk2 and flue gas recirculation rate rFRG are equal to one. The flue gas recirculation rFRG can be reduced for lower compressor exit pressure pk2 and for lower hot gas temperature Thot.

In case of a gas turbine 6 with sequential combustion the flue gas recirculation rate can be a function of the hot gas temperatures of the first combustion chamber 4 and the second combustion chamber 34. This can lead to an array of curves, which is not shown here. The hot gas temperature of the first combustion chamber can be kept close to constant in a wide load range down to about 50% relative load, e.g. operating load relative to the full load. Therefore, this array of curves can be simplified and the hot gas temperature of the second combustion chamber can be used to determine the flue gas recirculation rate rFRG.

The hot gas temperature can be defined as the average hot gas temperature of the hot gases entering a turbine. Instead of the hot gas temperature the so-called TIT turbine inlet temperature, which is a theoretical mixing temperature of the hot gases with the cooling air of the turbine, can be used, too.

Figure 5:
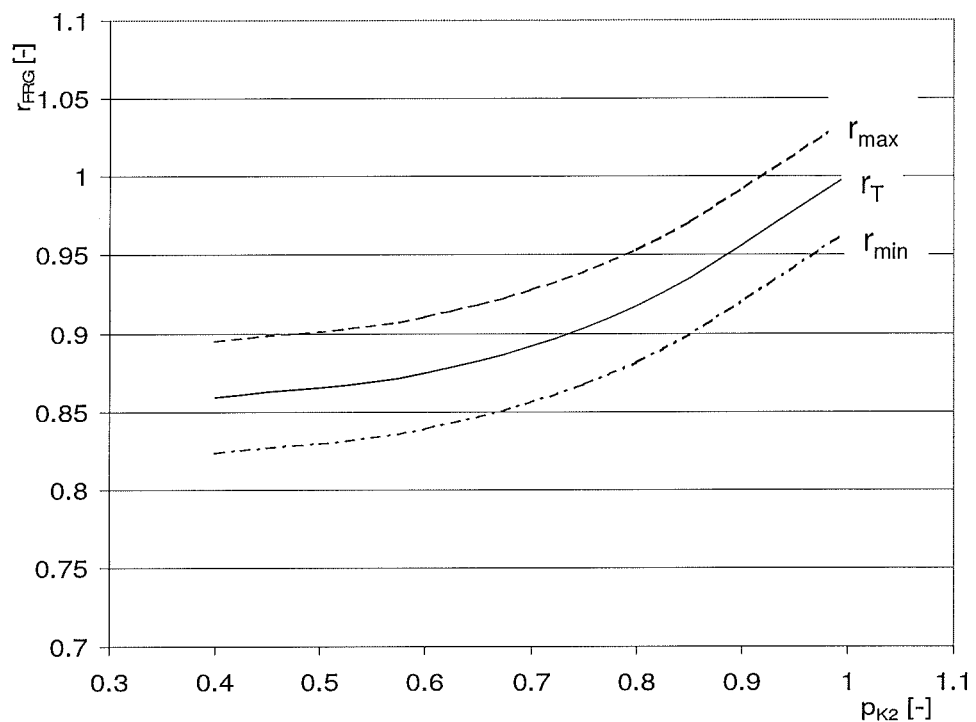
FIG. 5 illustrates an example of the target flue gas recirculation rate as a function OF the compressor exit pressure in accordance with an exemplary embodiment.

FIG. 5 illustrates an example of the target flue gas recirculation rate as a function OF the compressor exit pressure in accordance with an exemplary embodiment. FIG. 5 shows an example of the target flue gas recirculation rate rT as a function the compressor exit pressure pk2 with allowable range for flue gas recirculation rate adjustment for a given hot gas temperature Thot. The compressor exit pressure pk2 can be normalized with the compressor exit pressure at full load under design conditions. The flue gas recirculation rate rFRG, as well as the target rT, minimum rmin, and maximum flue gas recirculation rates rmax can be normalized with the flue gas recirculation rate rFRG at full load under design conditions. In this example the target flue gas recirculation rate can be determined in an open loop control as a function of the compressor exit pressure pk2. The actual flue gas recirculation rate rFRG can be adjusted with a closed loop control within the allowable range between the minimum flue gas recirculation range rmin and maximum flue gas recirculation range rmax given for the respective compressor exit pressure pk2.

For the closed loop adjustment of the flue gas recirculation rate rFRG for example the CO content in the flue gases or the combustor pulsation are used.

The function shown in FIG. 5 is valid for one hot gas temperature Thot. Depending on the operating conditions and design of the gas turbine the influence of the hot gas temperatures can be neglected and this simply a function of the compressor exit pressure pk2 can be used to control the recirculation rate rFRG for all operating conditions without taking into account the hot gas temperature Thot.

Figure 6:
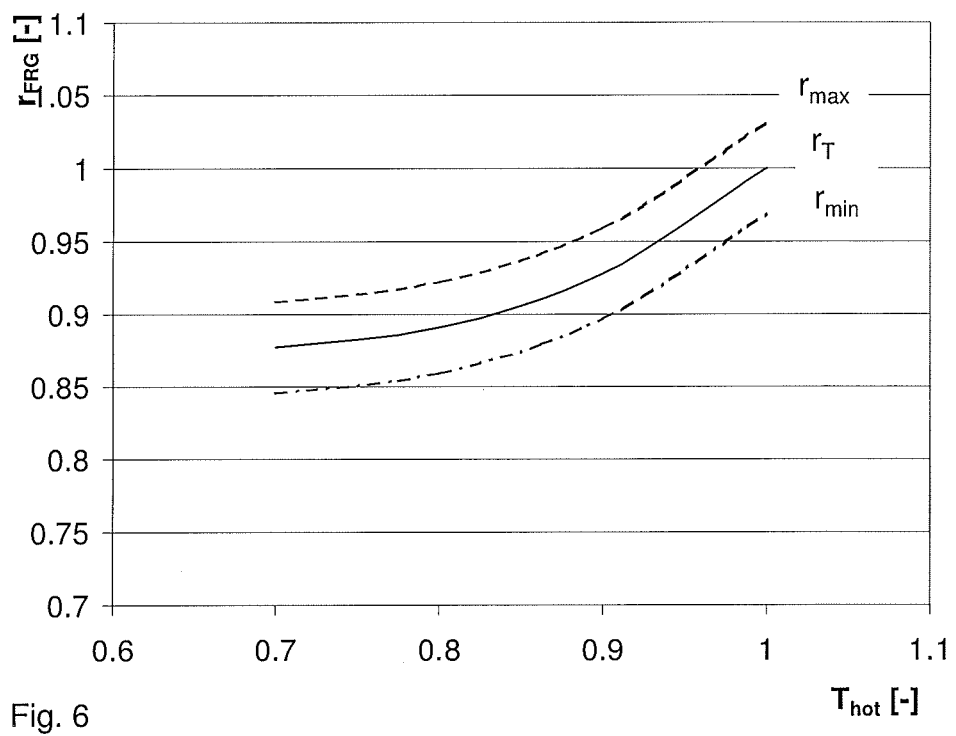
FIG. 6 illustrates an example of the target flue gas recirculation rate as a function of the hot gas temperature in accordance with an exemplary embodiment.

FIG. 6 illustrates an example of the target flue gas recirculation rate as a function of the hot gas temperature in accordance with an exemplary embodiment. FIG. 6 shows an example of the target flue gas recirculation rate as rT a function of the hot gas temperature Thot and the allowable bandwidth for flue gas recirculation rate adjustment for a given compressor exit pressure pk2.

The hot gas temperature Thot can be normalized with the hot gas temperature Thot at full load under design conditions. The flue gas recirculation rate rFRG, as well as the target rT, minimum rmin, and maximum flue gas recirculation rates rmax can be normalized with the flue gas recirculation rate rFRG at full load under design conditions. In this example the target flue gas recirculation rate can be determined in an open loop control as a function of the compressor exit pressure pk2. The actual flue gas recirculation rate rFRG can be adjusted with a closed loop control within the allowable range between the minimum flue gas recirculation range rmin and maximum flue gas recirculation range rmax given for the respective compressor exit pressure pk2.

The CO content of the flue gases or the combustor pulsation can be used as an input variable for the closed loop adjustment of the flue gas recirculation rate rFRG, for example. In one embodiment, the adjustment is proportional to the deviation of a target value in the CO content of the flue gases and/or the combustor pulsation.

In an exemplary embodiment, oxygen-enrichment of the gas turbine inert gases can be used to enhance the operational flexibility and to overcome the restrictions in recirculation rate at part load and base load.

In some combustion systems, staging of burners in a radial direction can be used to improve flame stability and pulsation behavior of the combustion. Staging can increase local hot gas temperatures, resulting in higher NOx. However, in the proposed operating method flue gas recirculation reduces the NOx emissions and therefore allows staging in a different operating range. To take advantage of this increased operating window an exemplary method in which the staging ratio is a function of the combustion pressure and/or the flue gas recirculation rate can be implemented. The staging ratio can for example be defined as the maximum fuel flow to a burner or a group of burners with increased fuel flow divided by the average fuel flow per burner. A control of the burner staging as a function of the compressor exit pressure pk2 can be provided for the flue gas recirculation ratio as a function of the compressor exit pressure pk2.

In an exemplary embodiment, combustion piloting with a diffusion flame can be used as another measure to improve flame stability and pulsation behavior. In known techniques, piloting can increase local hot gas temperatures, which can result in higher NOx and limits the use of piloting in improving flame stability and pulsation behavior. Because flue gas recirculation can reduce the NOx emissions it allows for piloting in a different operating range. To take advantage of this increased operating window, an exemplary piloting method in which the pilot fuel flow is a function of the combustion pressure and/or the flue gas recirculation rate can be implemented. A control of the pilot fuel flow as a function of the compressor exit pressure pk2 can be provided for the flue gas recirculation ratio as a function of the compressor exit pressure pk2.

Exemplary embodiments described above and in the drawings disclose to a person skilled in the art embodiments, which differ from the exemplary embodiments and which are contained in the scope of the disclosure. For example, a liquid fuel might be burned in the gas turbine instead of the fuel gas 5.

To realize a control method, which uses the CO or unburned hydrocarbons emissions as a control parameter, at a CO or unburned hydrocarbons emissions measurement device can be installed downstream of the gas turbine 6.

The emissions measurement device can for example be installed at the location of the gas turbine flue gas CO2 and/or O2 measurement devices 37 or at the location of the HRSG flue gas CO2 and/or O2 measurement devices corresponding measurement device 38. In another exemplary embodiment the emission measurement device can be a combined measurement device also having other measuring capabilities.

Thus, it will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

LIST OF REFERENCE SYMBOLS

1 Compressor
2 Ambient air
3 Compressor inlet gas
4 Combustor
5 Fuel gas for GT
6 Gas Turbine GT
7 Turbine
8 Hot flue gas from gas turbine
9 HRSG (heat recovery steam generator)
10 Flue gas blower for second partial flow (to CO2 capture system)
11 Flue gas blower for first partial flow (flue gas recirculation)
12 Bypass flap or valve
13 Steam turbine
14 Condenser
15 Steam extraction for CO2 capture
16 Feed water
17 Condensate return line
18 CO2 capture system
19 Flue gas from HRSG
20 Second partial flow (Flue gas line to CO2 capture system)
21 First partial flow (Flue gas recirculation)
22 CO2 depleted flue gas
23 Flue gas cooler (for second partial flow)
24 Flue gas bypass to stack
25 First generator
26 Second generator
27 Recirculation flue gas re-cooler (for first partial flow)
28 Compressor exit pressure or exit temperature measurement device
29 Flue gas splitter
30 Live steam
31 Captured CO2
32 Stack
33 High pressure turbine
34 Second combustion chamber
35 Low pressure turbine
36 Inlet gas CO2 and/or O2 measurement devices
37 Gas turbine flue gas CO2 and/or O2 measurement devices
38 HRSG flue gas CO2 and/or O2 measurement devices
CCPP Combined cycle power plant
rGT Gas turbine recirculation rate
rT target recirculation rate
rmin minimum recirculation rate
rmax maximum recirculation rate
Thot hot gas temperature

What is claimed is:

1. A method for operating a combined cycle power plant (CCPP) having a gas turbine and a heat recovery steam generator (HRSG) with a flue gas recirculation system, comprising:
    calculating a target value for a flue gas recirculation rate as a function of at least one of combustion pressure and a hot gas temperature of a combustion chamber;
    controlling a flue gas recirculation rate (rFRG) of flue gases recirculated into a compressor inlet gas of the gas turbine by the flue gas recirculation system as a function of at least one of the combustion pressure and the hot gas temperature (Thot) of the combustion chamber; and
    adjusting the flue gas recirculation rate based on measured CO emissions,
    wherein a control band establishes an allowable flue gas recirculation rate as a function of at least one of the combustion pressure and the hot gas temperature around the target value.

2. The method according to claim 1, comprising:
    providing a target oxygen concentration in the compressor inlet gas as a function of the combustion pressure of the gas turbine; and
    controlling the oxygen concentration in the inlet gas by variation of the flue gas recirculation rate (rFRG) and/or admixing of oxygen or oxygen enriched air.

3. The method according to claim 1, comprising:
    adjusting the flue gas recirculation rate (rFRG) and/or admixing of oxygen or oxygen enriched air as a function of measured CO and/or unburned hydrocarbon emissions.

4. The method according to claim 1, comprising:
    adjusting the flue gas recirculation rate (rFRG) and/or admixing of oxygen or oxygen enriched air as a function of the measured combustor pulsations.

5. The method according to claim 1, comprising:
    maintaining the flue gas recirculation rate (rFRG) above a minimum value to assure a minimum flow through a CO2 capture system.

6. The method according to claim 1, comprising:
    controlling a re-cooling temperature (Trecool) as a function of the combustion pressure and/or compressor exit temperature (Tk2).

7. The method according to claim 1, comprising:
    controlling a re-cooling temperature (Trecool) as a function of combustion pressure and/or compressor exit temperature (Tk2) and the recirculation rate.

8. The method according to claim 1, comprising:
    providing the target compressor inlet temperature of the gas turbine as a function of relative load; and
    controlling the compressor inlet temperature by adjusting re-cooling temperature (Trecool).

9. The method according to claim 1, comprising:
    controlling the flue gas recirculation rate (rFRG) based on a variable speed flue gas blower for recirculation and/or a variable speed flue gas blower to a stack.

10. A power plant designed for operation according to claim 1, comprising:
    a gas turbine;
    a heat recovery steam generator;
    a steam turbine;
    a flue gas recirculation line with a recirculation flue gas re-cooler;
    at least one of a compressor exit pressure measurement device and a compressor exit temperature measurement device; and at least one of an oxygen measurement device and a CO2 measurement device between a mixing point of recirculated flue gas and ambient air and a compressor of the gas turbine, or at least one of an oxygen measurement device, a CO2 measurement device, and a CO measurement device downstream of the gas turbine.

11. The power plant according to claim 10, comprising:
a gas turbine with a design compressor pressure ratio greater than 26.

12. The power plant according to claim 11, comprising:
a sequential combustion gas turbine with a design pressure of a second combustion chamber, which is greater than 15 bar.

13. The power plant according to claim 10, comprising:
a variable speed flue gas blower for at least one of a recirculation capture system and a CO2 capture system,
wherein the variable speed flue gas blower directs the flue gases to at least one of the recirculation capture system and the CO2 capture system for control of the recirculation rate.

14. The power plant according to claim 10, comprising:
an air separation unit or a membrane based oxygen enrichment unit for admixing oxygen or oxygen enriched air to the compressor inlet gases of the compressor and/or to a combustor.

15. A power plant designed for operation according to claim 1, comprising:
a gas turbine;
a heat recovery steam generator;
a steam turbine;
a flue gas recirculation line with a recirculation flue gas re-cooler;
at least one of a compressor exit pressure measurement device and a compressor exit temperature measurement device; and
at least one of an oxygen measurement device and a CO2 measurement device between a mixing point of recirculated flue gas and ambient air and a compressor of the gas turbine and at least one of an oxygen measurement device, a CO2 measurement device, and a CO measurement device or downstream of the gas turbine.

16. The method according to claim 1, wherein the target value for the flue gas recirculation rate is calculated as a function of only at least one of the combustion pressure and the hot gas temperature of the combustion chamber.

17. A method for operating a combined cycle power plant (CCPP) having a gas turbine and a heat recovery steam generator (HRSG) with a flue gas recirculation system, comprising:
calculating a target value for a flue gas recirculation rate as a function of at least one of combustion pressure and a hot gas temperature of a combustion chamber;
adjusting the flue gas recirculation rate based on measured CO emissions;
controlling the flue gas recirculation rate (rFRG) of flue gases recirculated into a compressor inlet gas of the gas turbine by the flue gas recirculation system as a function of at least one of the combustion pressure and the hot gas temperature (Thot); and
admixing oxygen or oxygen enriched air to at least one of the compressor inlet gases of a gas turbine compressor of the gas turbine and the combustion chamber of the gas turbine to allow a higher flue gas recirculation rate (rFRG),
wherein a control band establishes an allowable flue gas recirculation rate as a function of at least one of the combustion pressure and the hot gas temperature around the target value.

18. A method for operating a combined cycle power plant (CCPP) having a gas turbine and a heat recovery steam generator (HRSG) with a flue gas recirculation system, comprising:
calculating a target value for a flue gas recirculation rate as a function of at least one of combustion pressure and a hot gas temperature of a combustion chamber;
controlling the flue gas recirculation rate (rFRG) of flue gases recirculated into a compressor inlet gas of the gas turbine by the flue gas recirculation system as a function of at least one of the combustion pressure and the hot gas temperature (Thot) of the combustion chamber; and
adjusting the flue gas recirculation rate based on unburned hydrocarbon emissions,
wherein a control band establishes an allowable flue gas recirculation rate as a function of at least one of the combustion pressure and the hot gas temperature around the target value.

* * * * *

UNITED STATES PATENT AND TRADEMARK OFFICE
CERTIFICATE OF CORRECTION

PATENT NO. : 9,249,689 B2
APPLICATION NO. : 13/116522
DATED : February 2, 2016
INVENTOR(S) : Jaan Hellat et al.

Page 1 of 1

It is certified that error appears in the above-identified patent and that said Letters Patent is hereby corrected as shown below:

In the Claims

Column 15, In claim 15, line 42, change "and a CO measurement device or downstream of the gas turbine." to "and a CO measurement device downstream of the gas turbine."

Signed and Sealed this
Twenty-first Day of June, 2016

Michelle K. Lee
*Director of the United States Patent and Trademark Office*